(12) United States Patent
Surace et al.

(10) Patent No.: US 7,798,287 B1
(45) Date of Patent: Sep. 21, 2010

(54) ACOUSTICAL CEILING PANELS

(75) Inventors: Kevin J. Surace, Sunnyvale, CA (US);
Marc U. Porat, Beverly Hills, CA (US);
Brandon D. Tinianov, San Jose, CA (US); Matthew V. Golden, San Francisco, CA (US)

(73) Assignee: Serious Materials, Inc., Sunnyvale, CA (US)

( * ) Notice: Subject to any disclaimer, the term of this patent is extended or adjusted under 35 U.S.C. 154(b) by 0 days.

(21) Appl. No.: 11/040,043

(22) Filed: Jan. 20, 2005

(51) Int. Cl.
*E04B 1/82* (2006.01)
(52) U.S. Cl. .................... 181/290; 181/286
(58) Field of Classification Search ............... 181/284, 181/287, 290, 286, 291, 292, 293, 294, 295
See application file for complete search history.

(56) References Cited

U.S. PATENT DOCUMENTS

| | | | |
|---|---|---|---|
| 2,276,788 A * | 3/1942 | Norris | 454/296 |
| 2,811,906 A | 11/1957 | Chappell | |
| 3,160,549 A * | 12/1964 | Caldwell et al. | 428/317.3 |
| 3,215,225 A * | 11/1965 | Kirschner | 181/290 |
| 3,336,710 A | 8/1967 | Raynes | |
| 3,399,104 A * | 8/1968 | Ball, III et al. | 428/116 |
| 3,424,270 A | 1/1969 | Seymour et al. | |
| 3,462,899 A | 8/1969 | Sherman | |
| 3,579,941 A | 5/1971 | Tibbals | |
| 3,642,511 A | 2/1972 | Cohn et al. | |
| 3,828,504 A | 8/1974 | Egerborg et al. | |
| 4,003,752 A | 1/1977 | Osohata et al. | |
| 4,112,176 A | 9/1978 | Bailey | |
| 4,152,474 A * | 5/1979 | Cook et al. | 428/137 |
| 4,156,615 A | 5/1979 | Cukier et al. | |
| 4,347,912 A | 9/1982 | Flocke et al. | |
| 4,375,516 A | 3/1983 | Barrall | |
| 4,487,793 A | 12/1984 | Haines et al. | |

(Continued)

FOREIGN PATENT DOCUMENTS

CA 2219785 10/1996

(Continued)

OTHER PUBLICATIONS

Noise and Vibration Control Engineering: *Principles and Applications*, Edited by Leo Beranek and Instvan Ver, Chapter 11, John Wiley & Sons, Inc., 1002, (12 pages).

(Continued)

*Primary Examiner*—Jeffrey Donels
*Assistant Examiner*—Jeremy Luks
(74) *Attorney, Agent, or Firm*—Haynes and Boone, LLP

(57) ABSTRACT

A ceiling panel assembly is provided, including: a sound damping layer including a constraining layer and a first viscoelastic layer; and an acoustical absorption layer coupled to the sound damping layer. A suspended ceiling assembly is provided, including: a support structure attached to a structural ceiling of a room, the support structure including a plurality of support flanges; and a plurality of ceiling panel assemblies, each ceiling panel assembly positioned on the support flanges and comprising a sound damping layer including a constraining layer and a first viscoelastic layer. A method of manufacturing a ceiling panel assembly is provided, the method including: providing a sound damping layer including a constraining layer and a viscoelastic layer; and applying an acoustical absorption layer to the sound damping layer.

47 Claims, 12 Drawing Sheets

U.S. PATENT DOCUMENTS

| | | | |
|---|---|---|---|
| 4,618,370 | A | 10/1986 | Green et al. |
| 4,642,951 | A | 2/1987 | Mortimer |
| 4,663,224 | A | 5/1987 | Tabata et al. |
| 4,678,515 | A | 7/1987 | Green et al. |
| 4,685,259 | A | 8/1987 | Eberhart et al. |
| 4,759,164 | A | 7/1988 | Abendroth et al. |
| 4,778,028 | A * | 10/1988 | Staley .......... 181/208 |
| 4,786,543 | A | 11/1988 | Ferm |
| 4,901,485 | A * | 2/1990 | Menchetti et al. ........... 52/145 |
| 4,916,167 | A * | 4/1990 | Chen et al. ................ 521/159 |
| 4,924,969 | A | 5/1990 | K'Heureux |
| 4,956,321 | A | 9/1990 | Barrall |
| 4,967,530 | A * | 11/1990 | Clunn ................ 52/506.08 |
| 5,016,413 | A | 5/1991 | Counihan |
| 5,026,593 | A | 6/1991 | O'Brien |
| 5,033,247 | A * | 7/1991 | Clunn ................ 52/506.08 |
| 5,063,098 | A * | 11/1991 | Niwa et al. ............... 428/76 |
| 5,094,318 | A * | 3/1992 | Maeda et al. ............ 181/290 |
| 5,110,660 | A | 5/1992 | Wolf et al. |
| 5,125,475 | A * | 6/1992 | Ducharme et al. ........ 181/284 |
| 5,158,612 | A | 10/1992 | Savoly et al. |
| 5,240,639 | A | 8/1993 | Diez et al. |
| 5,256,223 | A | 10/1993 | Alberts et al. |
| 5,258,585 | A | 11/1993 | Juriga |
| 5,334,806 | A * | 8/1994 | Avery ...................... 181/286 |
| 5,342,465 | A | 8/1994 | Bronowicki et al. |
| 5,368,914 | A | 11/1994 | Barrett |
| 5,439,735 | A | 8/1995 | Jamison |
| 5,473,122 | A | 12/1995 | Kodiyalam et al. |
| 5,474,840 | A | 12/1995 | Landin |
| 5,502,931 | A | 4/1996 | Munir |
| 5,603,192 | A * | 2/1997 | Dickson ................ 52/238.1 |
| 5,629,503 | A | 5/1997 | Thomasen |
| 5,641,950 | A * | 6/1997 | Kotter ..................... 181/285 |
| 5,643,666 | A | 7/1997 | Eckart et al. |
| 5,664,397 | A | 9/1997 | Holz |
| 5,665,447 | A * | 9/1997 | Greaves et al. ............ 428/68 |
| 5,691,037 | A | 11/1997 | McCutcheon et al. |
| 5,695,867 | A * | 12/1997 | Saitoh et al. .............. 428/219 |
| 5,768,841 | A | 6/1998 | Swartz et al. |
| 5,824,973 | A | 10/1998 | Haines et al. |
| 5,867,957 | A | 2/1999 | Holtrop |
| 5,910,082 | A | 6/1999 | Bender et al. |
| 5,945,208 | A | 8/1999 | Richards et al. |
| 5,954,497 | A | 9/1999 | Cloud et al. |
| 6,077,613 | A | 6/2000 | Gaffigan |
| 6,123,171 | A | 9/2000 | McNett et al. |
| 6,213,252 | B1 | 4/2001 | Ducharme |
| 6,240,704 | B1 * | 6/2001 | Porter ..................... 52/794.1 |
| 6,266,427 | B1 * | 7/2001 | Mathur ..................... 381/353 |
| 6,286,280 | B1 | 9/2001 | Fahmy et al. |
| 6,290,021 | B1 | 9/2001 | Strandgaard |
| 6,309,985 | B1 * | 10/2001 | Virnelson et al. ........... 442/104 |
| 6,342,284 | B1 | 1/2002 | Yu |
| 6,381,196 | B1 | 4/2002 | Hein et al. |
| 6,389,771 | B1 | 5/2002 | Moller |
| 6,443,256 | B1 | 9/2002 | Baig |
| 6,632,550 | B1 | 10/2003 | Yu |
| 6,676,744 | B2 | 1/2004 | Merkley et al. |
| 6,699,426 | B1 | 3/2004 | Burke |
| 6,790,520 | B1 * | 9/2004 | Todd et al. ............... 428/318.4 |
| 6,800,161 | B2 | 10/2004 | Takigawa |
| 6,803,110 | B2 | 10/2004 | Drees et al. |
| 6,815,049 | B2 | 11/2004 | Veramasuneni |
| 6,822,033 | B2 | 11/2004 | Yu |
| 6,825,137 | B2 | 11/2004 | Fu et al. |
| 6,920,723 | B2 | 7/2005 | Downey |
| 6,941,720 | B2 | 9/2005 | Deford et al. |
| 7,041,377 | B2 | 5/2006 | Miura et al. |
| 7,181,891 | B2 * | 2/2007 | Surace et al. ................ 52/642 |
| 2002/0029929 | A1 | 3/2002 | Tinianov |
| 2002/0092703 | A1 | 7/2002 | Gelin et al. |
| 2002/0139611 | A1 | 10/2002 | Baig |
| 2003/0070367 | A1 | 4/2003 | Gelin et al. |
| 2004/0016184 | A1 * | 1/2004 | Huebsch et al. ............... 52/144 |
| 2004/0139679 | A1 * | 7/2004 | Della Pepa ................ 52/578 |
| 2004/0168853 | A1 * | 9/2004 | Gunasekera et al. ........ 181/290 |
| 2004/0177590 | A1 * | 9/2004 | Nudo et al. ................ 52/783.1 |
| 2004/0214008 | A1 * | 10/2004 | Dobrusky et al. ............ 428/421 |
| 2005/0040825 | A1 | 2/2005 | Sellers et al. |
| 2005/0050846 | A1 * | 3/2005 | Surace et al. ............... 52/782.1 |
| 2005/0103568 | A1 * | 5/2005 | Sapoval et al. .............. 181/293 |
| 2006/0048682 | A1 | 3/2006 | Wagh et al. |
| 2006/0057345 | A1 * | 3/2006 | Surace et al. ............... 428/213 |
| 2006/0059806 | A1 * | 3/2006 | Gosling et al. ............. 52/238.1 |
| 2006/0108175 | A1 * | 5/2006 | Surace et al. ............... 181/285 |
| 2007/0094950 | A1 | 5/2007 | Surace et al. |
| 2007/0107350 | A1 | 5/2007 | Surace et al. |

FOREIGN PATENT DOCUMENTS

| | | |
|---|---|---|
| EP | 1 154 087 B1 | 11/2001 |
| JP | 09-203153 | 8/1997 |
| WO | WO 96/34261 | 10/1996 |
| WO | WO 97/19033 | 5/1997 |
| WO | WO 00/24690 | 5/2000 |

OTHER PUBLICATIONS

Handbook of *Acoustical Measurements and Noise Control*, Edited by Cyril Harris, Chapter 32; Structureborne Sound Isolation, Chapter 33; Noise Control in Buildings, McGraw-Hill, Inc., 1991, (36 pages).

"Green Glue is your soundproofing solution and noise reduction material", www.greengluecompany.com (2 pages).

Acoustical: *A Sound Approach to Testing*, www.archest.com/pages (2 pages).

STC—*Sound Transmission Class—Discussion and Use*, www.sota.ca/stc_info.htm (3 pages).

ASTM International, Designation: C 1396/C 1396M-04, *Standard Specification for Gypsum Board* (7 pages).

Barbara C. Lippiatt, National Institute of Standards and Technology. BEES 3.0, "*Building for Environmental and Economic Sustainability* Technical Manual and User Guide", Oct. 2002, (198 pages).

Takada, et al., *Effect in Reducing Floor Impact Noise of Recycled Paper Damper Members*, Bulletin of Tokyo Metropolitan Industrial Technology Research Institute, No. 2 (1999) [certified English translation] (13 pages).

*Architectural Acoustics*, M. David Egan, J. Ross Publishing (Reprint 2007) p. 211; originally published McGraw-Hill, 1988 (5 pages).

Hastings, Mardi C.; Godfrey, Richard; Babcock, G. Madison, *Application of Small Panel Damping Measurements to Larger Walls*, Proc. SPIE vol. 2720, p. 70-76, Smart Structures and Materials 1996: Passive Damping and Isolation (7 pages).

van Vuure, A.W.; Verpoest, I., Ko, F.K., *Sandwich-Fabric Panels As Spacers in a Constrained Layer Structural Damping Application*, Composites Part B 32 (2001) 11-19, Elsevier Science Ltd. (9 pages).

Noise and Vibration Control, Revised Edition, pp. 306-315, Institute of Noise Control Engineering, 1988, Beranek, Leo L. (editor) (9 pages).

Noise and Vibration Control, Chapter Fourteen, *Damping of Panels*, Ungar, Eric E., pp. 434-473, McGraw-Hill, 1971, Beranek, Leo L. (editor) (7 pages).

Noise and Vibration Control Engineering, *Principles and Application*, pp. 466-479, John Wiley & Sons, 1992, Beranek, Leo L. and Ver, Istvan L. (editors) (9 pages).

Nashif, Ahid D.; Jones, David I. G.; Henderson, John P., *Vibration Damping*, pp. 290-305, John Wiley & Sons, 1985 (18 pages).

Architectural Acoustics, Principles and Practice, John Wiley & sons, 1992, Cavanaugh, William J. and Wilkes, Joseph A. (editors) (332 pages).

Fire Resistance Design Manual, Sound Control, Gypsum Association, GA-600-94 (14th Ed.) (107 pages).

Fire Resistance Design Manual, Sound Control, Gypsum Association, GA-600-97 (15th Ed.) (120 pages).

Fire Resistance Design Manual, Sound Control, Gypsum Association, GA-600-2000 (16$^{th}$ Ed.) (139 pages).

Noxon, Arthur M., *The Chain Is As Strong As Its Weakest Link*, An article written for the first Hong Kong HiFi Show, 1993, Translated and Published in Chinese, http://www.acousticsciences.com/articles/chain.htm (7 pages).

*Quiet Lightweight Floor Systems*, Reprint from Sound and Vibration Magazine, Jul. 1992, by David A. Harris, Building & Acoustic Design Consultants (7 pages).

Joyal, Brian, *Constrained-Layer Systems Provide Weight-Efficient, High Level Damping* (4 pages).

Dynamat materials http://web.archive.org/web/20010525113753/www.admteschusa.com/Dynamat.html Jun. 12, 2007, ADM Tech—Dynamic Control (15 pages).

Noise Killer: Pro Damping Compound Materials http://www.tnt-audio.com/clinica/noise.html May 18, 2007, 1998 (3 pages).

Waybackmachine search results for Jan. 1, 1996—Jun. 12, 2007 (1 page).

Frankovich, David, *The Four-Fold Method of Noise and Vibration Control* (8 pages).

Renninger, Jennifer, *Understanding Damping Techniques for Noise and Vibration Control* (8 pages).

Unified Facilities Criteria (UFC) *Noise and Vibration Control*, UFC 3-450-01. May 15, 200, Department of Defense (156 pages).

United States Gypsum, *Architectural and Construction Services, Design Data for Acousticians*, Feb. 1986 (4 pages).

*A Study of Techniques to Increase the Sound of Insulation of Building Elements*, Wyle Laboratories, Prepared for Dept. of Housing and Urban Development, Jun. 1973 (12 pages).

dB-Ply materials Sound Reducing Panels from Greenwood Forest Products, Inc., Apr. 24, 1997 (9 pages).

dB-Rock materials OMNI Products, Inc. (3 pages).

ASC WallDamp materials from Acoustic Sciences Corporation http://web.archive.org/web/20021013031149/www.asc-soundproof.com/index-walldamp... May 18, 2007 (21 pages).

Sounddown Viscoelastic Glue DG-A2, Sounddown Corporation (2 pages).

Nordisk Akustik A/S materials, http://web.archive.org/web/200206240933724/www.nordisk-akustik.dk/html_uk/prod03.ht... Jun. 11, 2007 (4 pages).

IES 2000 *Dampening and Visocelastic Membranes* (Jul. 2, 2003) Atlanta.com/product (pp. 1-6).

Waybackmachine search results for Jan. 1, 1996-May 3, 2006 (1 page).

"*Damping of plate flexural vibrations by means of viscoelastic laminae*" by D. Ross, E.E. Ungar, and E.M. Kerwin—Structural Damping, Section III, ASME, 1959, New York (41 pages).

Vandersall, H. L., "*Intumescent Coating Systems, Their development and Chemistry*" J. Fire & Flammability, vol. 2 (Apr. 1971) pp. 97-140 (45 pages).

English Language Abstract, JP Patent First Publication No. 09-203153, Aug. 5, 1997, (2 pages).

*A Study of Techniques to Increase the Sound of Insulation of Building Elements*, Wyle Laboratories, Prepared for Dept. of Housing and Urban Development, Jun. 1973 (16 pages).

*Field Sound Insulation Evaluation of Load-Beating Sandwich Panels for Housing*, Final Report, Prepared by Robert E. Jones, Forest Products Laboratory, Forest Service, U.S. Department of Agriculture, Aug. 1975 (53 pages).

*Sound Studio Construction on a Budget*, F. Alton Evererst, McGraw-Hill, 1997 (7 pages).

*Wood Handbook/Wood as an Engineering Material*, United States Department of Agriculture, Forest Service, General Technical Report FPL-GTR-113, Mar. 1999 (24 pages).

*Transmission Loss of Plasterboard Walls* by T. D. Northwood, Building Research Note, Division of Building Research, National Research Counsel, Ottawa, Canada (10 pages), Jan. 1970.

*A Guide to Airborne, Impact, and Structureborne Noise Control in Multifamily Dwellings*, U. S. Department of Housing and Urban Development, Prepared for the National Bureau of Standards, Washington, D. C., Jan. 1963 (5 pages).

*Transmission Loss of Leaded Building Materials*, Paul B. Ostergaard, Richmond L. Cardinell, and Lewis S. Goodfriend, The Journal of the Acoustical Society of America, vol. 35, No. 6, Jun. 1963 (7 pages).

*Dictionary of Architecture & Construction 2200 illustrations*, Third Edition, Edited by Cyril M. Harris, Professor Emeritus of Architecture Columbia University, McGraw-Hill, 2000 (7 pages).

*Dictionary of Engineering Materials*, Harald Keller, Uwe Erb, Wiley-Interscience by John Wiley & Sons, Inc. 2004 (4 pages).

*Chamber Science and Technology Dictionary*, by Professor Peter M. B. Walker, W & R Chambers Ltd and Cambridge University Press, 1988 (3 pages).

\* cited by examiner

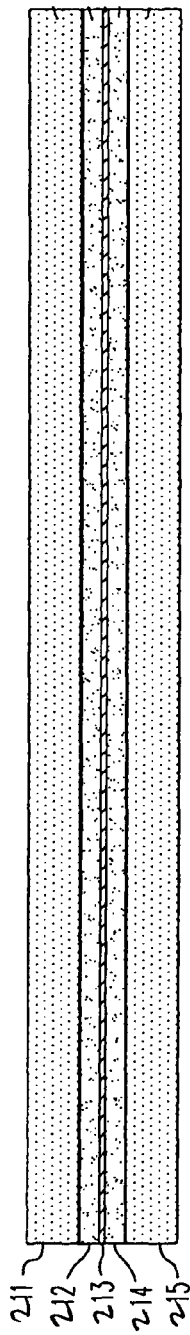
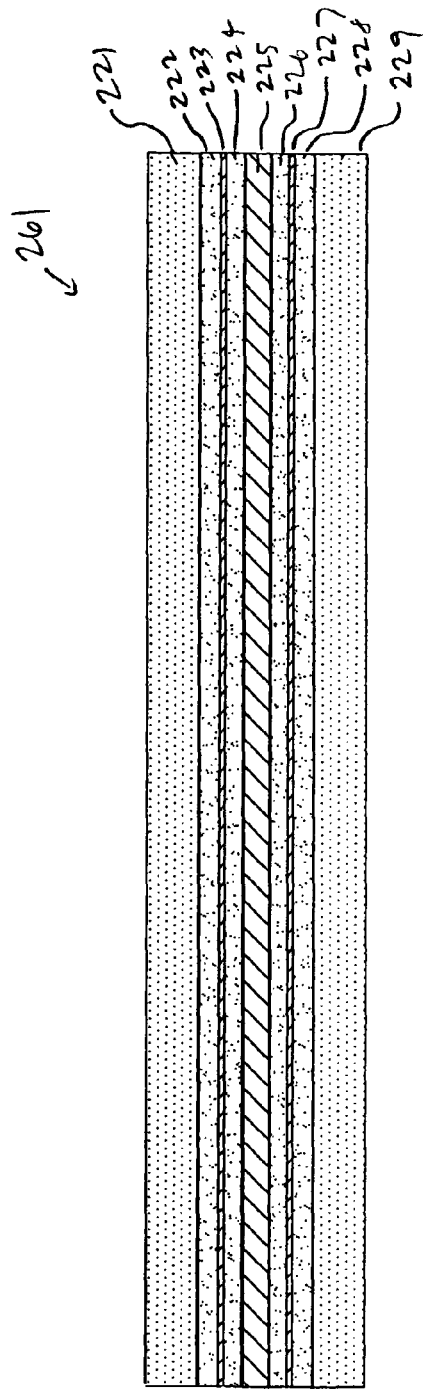

| 1/3 OCT BND CNTR FREQ | 63 | 80 | 100 | 125 | 160 | 200 | 250 | 315 | 400 | 500 |
|---|---|---|---|---|---|---|---|---|---|---|
| TL in dB | 19 | 26 | 25 | 26 | 26 | 26 | 28 | 29 | 31 | 32 |
| 95% Confidence in dB | 1.42 | 1.92 | 2.07 | 1.47 | 0.89 | 0.76 | 0.80 | 0.52 | 0.36 | 0.38 |
| deficiencies | | | | | | (1) | (2) | (4) | (5) | (5) |
| 1/3 OCT BND CNTR FREQ | 630 | 800 | 1000 | 1250 | 1600 | 2000 | 2500 | 3150 | 4000 | 5000 |
| TL in dB | 35 | 37 | 38 | 40 | 42 | 43 | 44 | 45 | 45 | 46 |
| 95% Confidence in dB | 0.29 | 0.44 | 0.38 | 0.39 | 0.36 | 0.56 | 0.55 | 0.31 | 0.32 | 0.50 |
| deficiencies | (3) | (2) | (2) | (1) | | | | | | |

| EWR | OITC | Specimen Area: 16 sq.ft. | STC |
|---|---|---|---|
| 38 | 32 | Temperature: 79 deg. F<br>Relative Humidity: 49 % | 37<br>(25) |

| 1/3 OCT BND CNTR FREQ | 63 | 80 | 100 | 125 | 160 | 200 | 250 | 315 | 400 | 500 |
|---|---|---|---|---|---|---|---|---|---|---|
| TL in dB | 22 | *28 | 24 | 24 | 27 | 26 | 27 | 30 | 30 | 31 |
| 95% Confidence in dB | 6.69 | 3.98 | 7.24 | 1.95 | 2.48 | 1.47 | 1.62 | 0.76 | 0.68 | 0.35 |
| deficiencies | | | | | | (0) | (2) | (2) | (5) | (5) |
| 1/3 OCT BND CNTR FREQ | 630 | 800 | 1000 | 1250 | 1600 | 2000 | 2500 | 3150 | 4000 | 5000 |
| TL in dB | 33 | 35 | 36 | 38 | 39 | 39 | 40 | 39 | 39 | 39 |
| 95% Confidence in dB | 0.73 | 0.62 | 0.85 | 0.62 | 0.46 | 0.77 | 0.57 | 0.55 | 0.32 | 0.56 |
| deficiencies | (4) | (3) | (3) | (2) | (1) | (1) | (0) | (1) | (1) | |

| EWR | OITC | * Minimum estimate of transmission loss. Measurement limited by filler wall. Actual TL will be equal to or greater than value reported. | Specimen Area: 16 sq.ft. Temperature: 73 deg. F Relative Humidity: 58 % | STC |
|---|---|---|---|---|
| 37 | 31 | | | 36 (30) |

ACOUSTICAL CEILING PANELS

CROSS REFERENCE TO RELATED APPLICATION(S)

This application is related to U.S. patent application Ser. No. 10/658,814 filed Sep. 8, 2003, by Kevin J. Surace and Marc U. Porat, entitled "Acoustical Sound Proofing Material and Methods for Manufacturing Same", U.S. patent application Ser. No. 10/938,051 filed Sep. 10, 2004, by Kevin J. Surace and Marc U. Porat, entitled "Acoustical Sound Proofing Material and Methods for Manufacturing Same," and U.S. patent application Ser. No. 10/975,530 filed Oct. 27, 2004, by Kevin J. Surace, entitled "Soundproof Assembly and Methods for Manufacturing Same," the disclosures of which are incorporated by reference herein in their entireties.

FIELD OF THE INVENTION

This invention relates to acoustical damping materials and, in particular, to acoustical damping materials used as ceiling tiles.

BACKGROUND OF THE INVENTION

Noise is emerging as both an economic and public policy issue. Soundproof rooms are required for a variety of purposes. For example, apartments, hotels and schools all require rooms with walls, ceilings and floors that minimize the transmission of sound thereby to avoid annoying people in adjacent rooms. Soundproofing is important for offices and meeting/conference rooms where speech privacy is sought. Another facet of privacy is the requirements legislated under the Health Insurance Portability and Accountability Act (HIPAA), for environments such as doctors' offices, medical examining rooms, or pharmacies. The HIPAA act requires that covered entities, such as hospitals, physician offices, and other medical treatment facilities, must implement reasonable safeguards to limit incidental eavesdropping, and avoid prohibited uses and disclosures of private patient information. These safeguards include physical facility safeguards to protect patient privacy. As a result, these medical treatment facilities may be particularly concerned with providing adequate sound transmission reduction in areas where patient information is discussed. Soundproofing is also particularly important in buildings adjacent to public transportation, such as highways, airports and railroad lines. Additional noise sources include theaters, home theaters, music practice rooms, recording studios and others. One measure of the severity of the problem is the widespread emergence of city building ordinances that specify minimum noise isolation ratings.

Various types of ceiling systems have been used in commercial and residential building construction to provide the desired acoustical performance. One popular type of ceiling system is a suspended acoustical tile ceiling, which typically comprises some sort of frame structure suspended from the structural ceiling of the room. A plurality of ceiling tiles are then supported by the frame structure, thereby creating a ceiling plenum above the ceiling tiles. This ceiling plenum may be used to provide an easily accessible space in which heating, plumbing, wiring, and other service installations may be disposed. In many conventional commercial installations, the interior walls terminate at the suspended ceiling grid face, with the ceiling plenum extending across the interior walls of the building. This creates a common cavity and a likely path for sound transmission between adjacent rooms.

In one type of suspended ceiling, the frame structure comprises a grid of T-bars, which are used to support a plurality of rectangular "drop-in"-type ceiling tiles. These ceiling tiles may vary in size, but are often 2'×2' or 2'×4'.

The American Society for Testing and Materials (ASTM) has developed test method E1414 to standardize the measurement of airborne sound attenuation between rooms sharing a common ceiling plenum. The rating derived from this measurement standard is known as the Ceiling Attenuation Class (CAC). Ceiling materials and systems having higher CAC values have a greater ability to reduce sound transmission through the ceiling plenum.

Another important characteristic for ceiling tile materials is the ability to reduce the amount of reflected sound in a room. One measurement of this ability is the Noise Reduction Coefficient (NRC) rating as described in ASTM test method C423. This rating is the average of sound absorption coefficients at four 1/3 octave bands (250, 500, 1000, and 2000 Hz), where, for example, a system having an NRC of 0.90 has about 90% of the absorbing ability of an ideal absorber. More recently, the NRC has been superseded by Sound Absorption Average (SAA), which is also governed by the ASTM C423 test method. The SAA value is the average of the sound absorption coefficients for twelve 1/3 octave bands from 200 to 2500 Hz, inclusive. For both the NRC and SAA, a higher value indicates that the material provides better sound absorption and reduced sound reflection. Within the context of this document, the terms NRC and SAA are used interchangeably and are considered generally equivalent ratings of sound absorption.

Increasing the amount of sound absorption in a room can decrease the amount of reverberation in the room. Reverberation time is the time required for the sound pressure level to decay by 60 dB after the sound source has stopped. This is an important design parameter, because a shorter reverberation time indicates a reduction of interior noise levels and increased speech intelligibility. Reverberation time is dependant upon the volume of the room and the amount of sound absorption present. The selection of the amount of sound absorption to be provided for a particular room depends upon the intended usage of the room. In commercial settings, the desired acoustical properties of a ceiling are generally balanced with a desire to minimize material and labor costs during construction. Conventional ceiling tiles are often formed by a substrate of, for example, mineral or wood fiber, with a facing material layer provided on the side exposed to the interior of the room. The mineral fiber substrate provides the primary sound absorption qualities, while the facing material layer is generally used to improve the aesthetic appearance of the ceiling tiles.

Materials having good absorption properties are often porous and allow sound to easily pass through the material, thereby resulting in high sound transmission and in poor sound attenuation. Therefore, if high sound attenuation is desired, a customer may often have to compromise on sound absorption in selecting a material for use as a ceiling panel. In some conventional ceiling tile installations, additional acoustic insulation is added above the ceiling tiles in the ceiling plenum. While this may improve aspects of the acoustic performance of the ceiling, the installation of additional insulation can dramatically increase the cost of installation and maintenance, and add bulk to the ceiling system's design. Further, the technique is a non-standard method and may lead to inconsistent results. Accordingly, there is a need for an improved and integrated system for use as a ceiling panel that provides both high sound absorption and high sound attenuation properties.

SUMMARY OF THE INVENTION

In accordance with the present invention ceiling panel assemblies and methods of manufacturing ceiling panel assemblies are provided. Various embodiments of the ceiling tile assemblies may provide improved sound performance characteristics, including improved sound attenuation with reduced sound reflectance.

In accordance with one embodiment, a ceiling panel assembly is provided comprising a sound damping layer including a constraining layer and a first viscoelastic layer; and an acoustical absorption layer coupled to the sound damping layer is described.

In accordance with another embodiment, a suspended ceiling assembly is provided, comprising: a support structure attached to a structural ceiling of a room, the support structure comprising a plurality of support flanges; and a plurality of ceiling panel assemblies, each ceiling panel assembly positioned on the support flanges and comprising a sound damping layer comprising a constraining layer and a first viscoelastic layer.

In accordance with another embodiment, a method of manufacturing a ceiling panel assembly is provided, the method comprising: providing a sound damping layer comprising a constraining layer and a viscoelastic layer; and applying an acoustical absorption layer to the sound damping layer.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE DRAWINGS

This invention will be more fully understood in light of the following drawings taken together with the following detailed description.

FIG. 2 shows a laminar structure which can be used in constructing a ceiling tile assembly in accordance with embodiments of the present invention.

FIG. 3 shows a second laminar structure which contains nine (9) layers of material and which can be used in constructing a ceiling tile assembly in accordance with embodiments of the present invention.

DETAILED DESCRIPTION

In the following description, reference is made to the accompanying drawings which illustrate several embodiments of the present invention. It is understood that other embodiments may be utilized and mechanical, compositional, structural, and operational changes may be made without departing from the spirit and scope of the present disclosure. The following detailed description is not to be taken in a limiting sense, and the scope of the embodiments of the present invention is defined only by the claims of the issued patent.

Figure 1A:
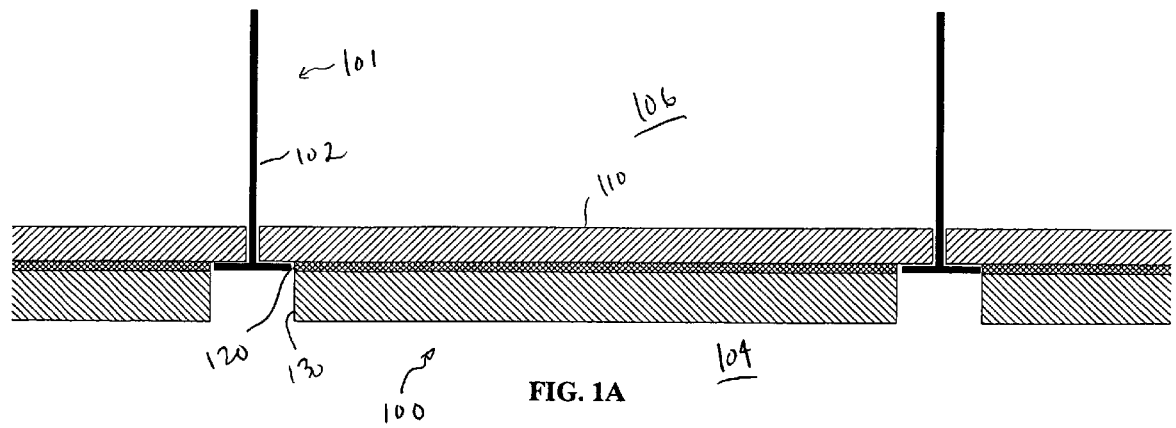
FIGS. 1A-1B show side and top views of a ceiling tile assembly in accordance with embodiments of the present invention.
Figure 1B:
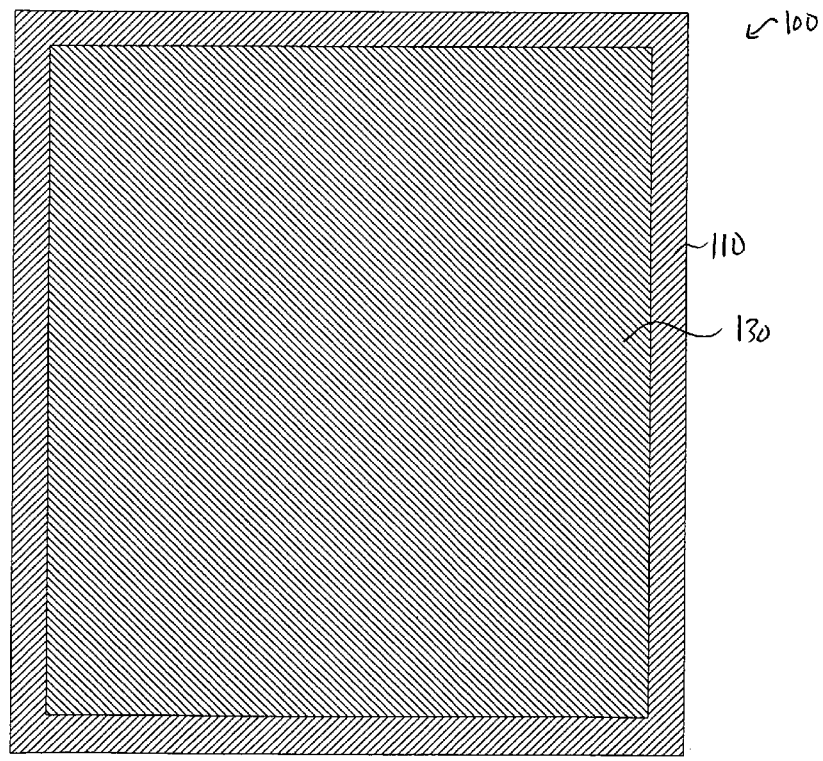

FIG. 1A shows a side cross-sectional view of a ceiling tile assembly 100, in accordance with embodiments of the present invention. FIG. 1B is a front view of the ceiling tile assembly 100. Each ceiling tile 100 is supported by support structure 101. In this embodiment, the support structure 101 comprises a plurality of T-bars 102, and each ceiling tile 100 comprises a damped panel layer 110, an absorption layer 130, and an adhesive layer 120 coupling the damped panel layer 110 to the absorption layer 130. In this embodiment, the absorption layer 130 faces the interior 104 of the room and the damped panel layer 110 faces the ceiling plenum 106. As shown, the ceiling tile assembly 100 is positioned on the support structure 101 such that the damped panel 110 contacts the T-bars 102 to suspend the ceiling tile assembly 100. In other embodiments, design of the support structure 101 and the ceiling tile assembly 100 may vary.

The damped panel layer 110 may comprise any of a variety of damped panels having a mass layer and a constraining layer coupled using a viscoelastic adhesive layer, as will be described in greater detail below.

The absorption layer 130 comprises a material having a high SAA value. In some embodiments, the absorption layer 130 comprises a material having an SAA value greater than the SAA value of the damped panel layer 110. In some embodiments, the material has an SAA value of at least 0.70. In other embodiments, such as applications requiring a low profile absorption layer 130, the NRC/SAA value may be at least 0.20 or, more preferably, at least 0.40. In certain embodiments, the absorption layer 130 may be omitted, and the damped panel layer 110 alone may be positioned on the support structure 101. The absorption layer 130 can comprise, e.g., fiberglass, mineral wool, melamine foam, other foam material, or combinations thereof. Mineral wool is an inorganic fibrous mass of fine interlaced filaments that is produced by steam blasting and cooling molten glass, furnace slag, rock, or the like. Similar substances are also known as mineral cotton, silicate cotton, stone wool, slag wool, and rock wool. One suitable melamine foam is Polydamp® Melamine Foam (PMF) from Polymer Technologies, Inc., of Newark, Del. Suitable fiberglass ceiling tiles are available from United States Gypsum (USG) Corp., of Chicago Ill. or Armstrong World Industries, of Lancaster, Pa. As stated above, the surface of the tile may be covered with a layer designed to enhance the aesthetics, the acoustical performance, or both.

The adhesive layer 120 may comprise any material suitable to connect the materials on either side of the adhesive layer 120, e.g., a conventional construction glue, such as the latex-based Liquid Nails® Ceiling Tile Adhesive CT-20, manufactured and distributed by Macco Adhesives of Cleveland, Ohio.

The ceiling tile assembly 100 can be manufactured by applying the adhesive to the damped panel layer 110 and/or the absorption layer 130, and then pressing the layers 110 and 130 together. Because the adhesive layer 120 provides only structural support and does not provide any acoustical benefits, the adhesive layer 120 need not have a consistent thickness or extend the entire width of the ceiling tile assembly 100. When using the Liquid Nails® adhesive, the layers 110, 130 may only need to be held together using a force of 1 psi for less than an hour at room temperature in order to form the ceiling tile assembly 100.

The damped panel layer 110 can take various forms. Various embodiments of the damped panel layer are described in U.S. patent application Ser. No. 10/975,530 filed Oct. 27, 2004, by Kevin J. Surace, entitled "Soundproof Assembly and Methods for Manufacturing Same," the disclosure of which is incorporated by reference herein in its entirety. In one embodiment, the damped panel layer 110 comprises a laminar panel 200, shown in FIG. 2, having an overall thickness of, e.g., 0.625". In FIG. 2, the top layer comprises a first mass layer 211. This first mass layer 211 may comprise, for example, a standard gypsum material and in one embodiment is approximately 0.25" thick. Of course, many other combinations and thicknesses can be used for any of the layers as desired. The thicknesses are limited only by the acoustical attenuation (i.e., ceiling attenuation class (CAC), Noise Insulation Class (NIC), sound transmission class (STC), or similar rating) desired for the resulting laminar structure and by the weight of the resulting structure which will limit the ability of workers to install the laminar layer for its intended use.

The gypsum board in first mass layer 211 typically is fabricated using standard well-known techniques and thus the method for fabricating the gypsum board will not be described. Next, on the bottom of the first mass layer 211 is a viscoelastic adhesive layer 212. This viscoelastic adhesive layer 212 may comprise, e.g., a "QuietGlue™" adhesive, sold by the Quiet Solution Corp. of Sunnyvale, Calif. The QuietGlue adhesive layer 212 comprises a unique viscoelastic polymer which has the property that the energy in the sound and vibration which strikes the adhesive, when constrained by surrounding layers, will be significantly dissipated by the adhesive thereby reducing the sound and vibration's amplitude across a broad frequency spectrum. Thus the energy of sound which will transmit through the resulting laminar structure is much less than that would be for undamped structures with otherwise similar physical characteristics. Typically, the viscoelastic adhesive layer is made of the materials as set forth in TABLE 1, although other adhesive layers may be used. Preferably, the viscoelastic adhesive layer having the characteristics set forth directly below Table 1 are used.

TABLE 1

| QuietGlue ™ Adhesive Chemical Makeup | | |
|---|---|---|
| Acetaldehyde | 0.00001% | 0.00010% |
| acrylate polymer | 33.00000% | 65.00000% |
| Acrylonitrile | 0.00001% | 0.00100% |
| Ammonia | 0.00100% | 0.01000% |
| bis(1-hydroxy-2-pyridinethionato) Zinc | 0.01000% | 0.10000% |
| Butyl acrylate | 0.00100% | 0.10000% |
| Butyl acrylate, methyl methacrylate, styrene, methacrylic acid 2-hydroxyethyl acrylate polymer | 5.00000% | 15.00000% |
| CI Pigment Yellow 14 | 0.01000% | 0.02000% |
| Ethyl acrylate | 0.00001% | 0.00010% |
| Ethyl acrylate, methacrylic acid, polymer with ethyl-2-propenoate | 1.00000% | 5.00000% |

TABLE 1-continued

| QuietGlue ™ Adhesive Chemical Makeup | | |
|---|---|---|
| Formaldehyde | 0.00100% | 0.01000% |
| hydrophobic silica | 0.00100% | 0.01000% |
| paraffin oil | 0.10000% | 1.00000% |
| polymeric dispersant | 0.00100% | 0.01000% |
| potassium tripolyphosphate | 0.00000% | 0.00200% |
| Silicon dioxide | 0.00100% | 0.10000% |
| sodium carbonate | 0.01000% | 0.10000% |
| Stearic acid, aluminum salt | 0.00100% | 0.10000% |
| Surfactant | 0.00100% | 0.10000% |
| Vnyl acetate | 0.10000% | 1.00000% |
| Water | 25.00000% | 40.00000% |
| zinc compound | 0.00100% | 0.10000% |

The physical solid-state characteristics of QuietGlue™ adhesive include:
1) a broad glass transition temperature starting below room temperature;
2) mechanical response typical of a rubber (i.e., high elongation at break, low elastic modulus);
3) strong peel strength at room temperature;
4) weak shear strength at room temperature;
5) swell in organic solvents (e.g., Tetrahydrofuran, Methanol);
6) does not dissolve in water (swells poorly);
7) peels off the substrate easily at temperature of dry ice.

Following the viscoelastic adhesive layer 212 is a constraining layer 213. The constraining layer 213 may comprise, for example, a metal layer. In one embodiment, the constraining layer 213 comprises a sheet of 30 gauge galvanized steel having a thickness of approximately 0.013". Of course, other gauge galvanized steel and even other metals can be used if desired. For example, aluminum can also be used if desired, as can specialty metals such as sheets of ultra-light weight titanium and laminated layers of metal including laminates of aluminum and titanium.

Following the constraining layer 213 is a second viscoelastic adhesive layer 214. The second viscoelastic adhesive layer 214 may be placed in a carefully controlled manner with respect to coverage and thickness on the bottom of constraining layer 213. The adhesive layer 214 is again a viscoelastic adhesive material which absorbs sound. Typically, the second viscoelastic adhesive layer 214 comprises the same material as the first viscoelastic adhesive layer 212. In embodiments utilizing QuietGlue™ adhesive layers 212, 214 and galvanized steel constraining layer 213, it is desirable for the galvanized steel to be non-oiled and of regular spackle. Non-oil is desirable to insure that the QuietGlue™ adhesive layer 212 will adhere to the top surface of constraining layer 213 and the adjacent QuietGlue™ adhesive layer 214 on the bottom of constraining layer 213 will also adhere to the constraining layer 213. Regular spackle insures that the metal has uniform properties over its whole area.

A second mass layer 215 is provided on the bottom of the structure. The second mass layer 215 may be similar to the first mass layer 211 and comprise a gypsum board layer which is carefully pressed in a controlled manner with respect to uniform pressure (pounds per square inch), temperature and time. Finally, the assembly is subjected to dehumidification and drying to allow the panels to dry, typically for twelve to forty-eight (48) hours.

Typically, but not always, gypsum board layers 211 and 215 will contain fiber to reduce shrinkage so that the resulting laminar structure will meet fire codes. Typical fire codes require a ceiling panel to have surface burning characteristics that do not support a flame or generate smoke. This is typically referred to as a Class A fire rating. Additionally, the panel, with its metal core, together with the external gypsum board layers, is intended to provide a resulting laminar structure yielding a benefit of a minimum of one hour resistance to fire when used with the appropriate fire-resistant ceiling grid.

As described above, the constraining layer 213 may comprise a metal layer of 36 gauge galvanized steel (which is about the thickness of a business card), but may be other metals, ranging from 10 gauge to 40 gauge, depending on weight, thickness, and CAC desired. It may be particularly desirable that before assembling, this metal should not be creased. Creasing may significantly reduce the ability of this metal to assist in reducing the transmission of sound. Accordingly, completely flat, undamaged pieces of metal may be desirable in the laminar structure.

In an alternative embodiment, the constraining layer 213 comprises a mass-loaded vinyl or similar product. However, the steel has much greater stiffness than vinyl and thus can outperform vinyl as a constraining layer. In addition, the mass-loaded vinyl may cause the final ceiling tile assembly to be too heavy to be easily installed into conventional T-bar support systems. However, for other ease-of-cutting reasons, vinyl can be used in the laminar structure in place of steel, if desired. Cellulose, wood, gypsum, plastic, ceramic, composite or other constraining materials may also be used in place of vinyl or metal. The alternative material can be any type and any appropriate thickness. The resulting structure is capable of being cut using standard wood saws with wood blades.

The process for creating such laminar panels takes into account many factors: the exact chemical composition of the adhesive; the various symmetric and non-symmetric thicknesses of the adhesive and the layered material; the pressing process; and the drying and dehumidification process.

When the ceiling tile assembly 100 is installed in a room, the absorption layer 130 provides the desired sound absorption qualities to increase the NRC/SAA values of the ceiling and thereby reduce echo and reverberation time in the room. The damped panel layer 110 provides the desired reduction in sound transmission in order to increase the CAC/NIC values. Thus, the ceiling tile assembly 100 may achieve improvements in combined NRC/SAA and CAC/NIC values over conventional designs.

These improved acoustic characteristics can be achieved by the combination of sound dampening and sound absorption provided by the structures described herein. The absorption layer 130 can provide conventional sound absorption, as is well known in the art. However, when the sound waves strike the constrained viscoelastic layer, the acoustic energy is dissipated. The sound waves cause shear forces on the viscoelastic material. These shear forces create waves in the constrained structure. Because the constraining layer provides a restoring force on the viscoelastic layer, the kinetic energy (in the form of noise and vibration) is converted into thermal energy, without having to rely on a single extremely massive structure to provide the desired reduction in sound transmission.

When the laminar panel 200 is used as the damped panel layer 110 in the ceiling tile assembly 100, improved CAC values may be achieved. In some embodiments, it is expected that the CAC may be increased by 5-25 points over conventional ceiling tile designs incorporating fiberglass, mineral board, and gypsum board, depending on the construction methods, ceiling height, grid type, and other variables.

FIG. 3 shows a laminar panel 261, in accordance with other embodiments of the present invention. Two external layers 221 and 229 of gypsum board have coated on each of their interior faces a viscoelastic adhesive layer of 222 and 228, respectively, preferably made of a viscoelastic polymer, such as the QuietGlue™ adhesive layer 212 in FIG. 2. Such a viscoelastic polymer has the ability to absorb sound energy through deformation of the viscoelastic material in response to the acoustic energy of the sound. On the interior faces of the QuietGlue™ adhesive are two constraining layers 223 and 227. Typically, these two constraining layers 223 and 227 may comprise sheet metal layers and are each galvanized steel. In one embodiment, the galvanized steel is 30 gauge, 0.013" thick, but other thicknesses of steel, as well as other metals, can also be used as desired. The interior faces of the constraining layers 223 and 227 are coated with additional viscoelastic adhesive layers 224 and 226, respectively. These adhesive layers 224, 226 may comprise a viscoelastic material of the same type as layers 222 and 228. Then the core of the structure is made up of a wood-based sheet 225. This wood-based sheet may comprise, e.g., a pine laminar sheet which is of a type commonly used in plywood. In one embodiment, the pine laminar sheet is 1/10" thick, but may also be MDF (Medium Density Fibreboard) or other wood-based materials.

Again, the constraining layers 223 and 227 may comprise non-oiled and regular spackle galvanized steel layers for the reasons discussed above in conjunction with the embodiment of FIG. 2. The adhesive layers comprise a viscoelastic material capable of absorbing sound. The resulting product has a thickness of approximately 7/8" and weighs approximately 115 pounds per 4'×8' section. The steel layers should not be creased before assembly as this may result in less than optimal results. The resulting structure again may be cut using a standard power saw using wood blades. The interior layer 225 of wood is in one embodiment 1/10" thick SierraPine™ MDF acquired from SierraPine Ltd. of Rocklin, Calif.

In fabricating the laminar panel structures 200, 261 of FIGS. 2-3, the adhesive is first rolled in a prescribed manner, typically to 1/16" thickness, although other thicknesses can be used if desired, onto the gypsum and then steel is laid on the adhesive. Depending on the drying and dehumidification techniques deployed, anywhere from 6 to 48 hours are required to dry totally the adhesive in the case that the adhesive is water-based. A solvent-based viscoelastic adhesive can be substituted. The resulting structure is dried in a prescribed manner under a pressure of approximately 1 to 5 pounds per square inch, depending on the exact requirements of each assembly, although other pressures can be used as desired. To make laminar panel 261 of FIG. 3, each of the gypsum board-adhesive-metal layer structures has an additional layer of adhesive rolled onto the exposed surface of the metal to approximately 1/16" thickness and then the thin pine wood layer is placed between the two layers of adhesive on the already fabricated gypsum-adhesive-metal sheets. The resulting structure is placed in a press and 1 to 5 pounds per square inch of pressure is applied to the structure and up to 48 hours is allowed for drying.

Figure 4:
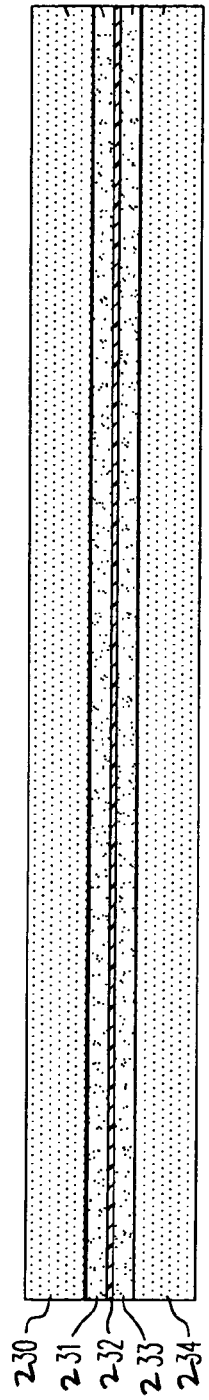
FIGS. 4-5 show alternative embodiments of laminar panels which can be used in constructing a ceiling tile assembly in accordance with embodiments of the present invention.

FIG. 4 shows another embodiment of the acoustical soundproofing material useful for practicing the invention. In FIG. 4, a laminar panel 262 is constructed of two external layers of gypsum board 230 and 234 that have on their interior faces adhesive layers 231 and 233, respectively. Between the two adhesive layers 231 and 233 is a constraining material 232 comprising vinyl. This vinyl is mass loaded and, in one embodiment, is 1 pound per square foot or greater, and is available from a number of manufacturers, including Tecnifoam, Inc, of Minneapolis, Minn. The total weight of this structure when the external layers 230 and 234 of gypsum board are each 5/8" thick, the layers of viscoelastic Quiet- Glue™ adhesive 231 and 233 are each approximately 1/16" thick and the mass loaded vinyl is approximately 1/8" thick, is about 190 pounds per 4'×8' foot section. The total finished thickness of the material is 1.3" to 1.5" depending on the thickness of the vinyl and the actual thicknesses of the viscoelastic QuietGlue™ adhesive layers 231 and 233.

The laminar panel 262 of FIG. 4 cannot be scored like regular drywall, but rather must be cut using a wood saw. A typical wood saw blade is adequate to cut the laminar panel material of FIG. 4.

Figure 5:
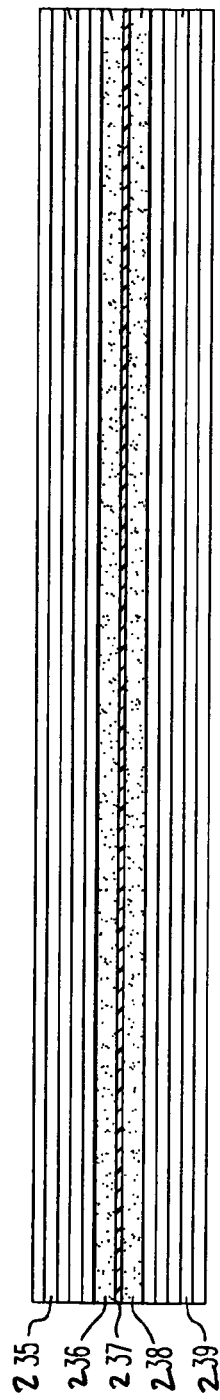

FIG. 5 shows an additional embodiment of a laminar panel 263 which can be used to implement the invention. In this embodiment, two external layers 235 and 239 are 5/8" plywood and have on their interior faces layers 236 and 238 of QuietGlue™ adhesive, respectively. Between the QuietGlue™ adhesive is a layer of mass loaded vinyl 237. The plywood sheets 235 and 239 are each typically 5/8" thick in one embodiment. In this embodiment, the layers of QuietGlue™ adhesive 236 and 238 are each approximately 1/16" thick (although other thicknesses can be used if desired) and the mass loaded vinyl 237 is typically 1/16" to 1/4" thick. When the mass loaded vinyl is 1/8" thick, then the total thickness of the structure of FIG. 5 is approximately 1.5" thick. If the vinyl is 1/16" thick, then the total thickness is approximately 1.4".

The structure of FIG. 4 standing alone has an STC of 38, while the structure of FIG. 5 has an STC of 36. The structures of FIGS. 2-3 have STCs of 37 and 39, respectively.

It is noted that uneven application of QuietGlue™ adhesive or leaving an air gap at the ends of the sheets of soundproofing material described above may hurt the STC ratings by several points. Moreover, to improve the soundproofing qualities of ceiling tiles made with these materials, it is desirable to evenly apply the adhesive all the way to the ends and corners of the sheets. As a general matter, the panels described above should not be scored like regular drywall. Rather, these panels should be cut using a saw blade, typically a wood saw blade.

The ceiling attenuation class (CAC) and sound transmission class (STC) ratings given above are basically numbers which are used in the architectural field to rate ceilings, partitions, doors and windows for their effectiveness in blocking sound respectively. The number assigned to a particular architectural design as a result of prior CAC or STC testing represents a best fit type of approach to a set of curves that define the ceiling attenuation class or sound transmission class. The tests are conducted in such a way to make their results independent of the test environment and provide an acoustical performance rating for the architectural element (e.g. suspended ceiling system) only. The CAC test method is given in ASTM E1414, a simulated office environment test using acoustical data obtained in 1/3 octave bands, and ASTM E413 for classification of sound insulation. The STC measurement method is given in ASTM E90, a test for airborne sound insulation obtained in 1/3 octave bands, and ASTM E413 for classification of sound insulation ratings. These standards are available on the interne at http://www.astm.org.

Figure 6:
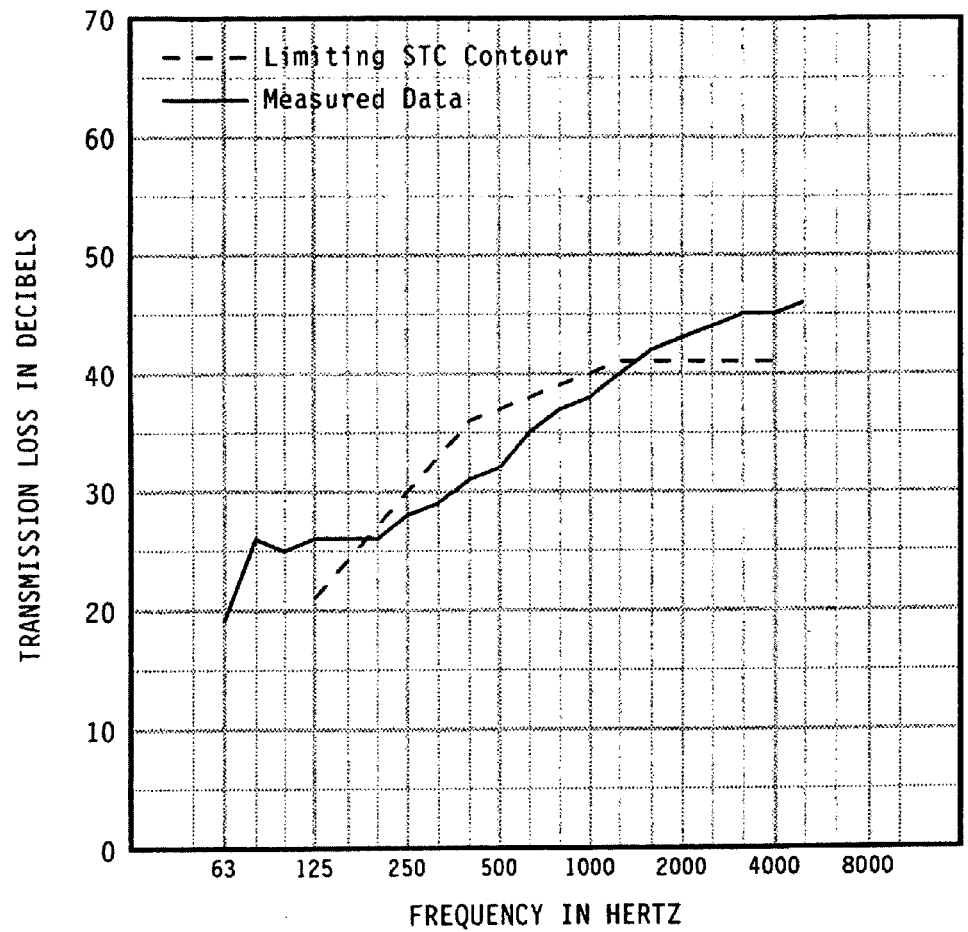
FIGS. 6-10 show sound attenuation test results on several laminar panels described herein.
Figure 7:
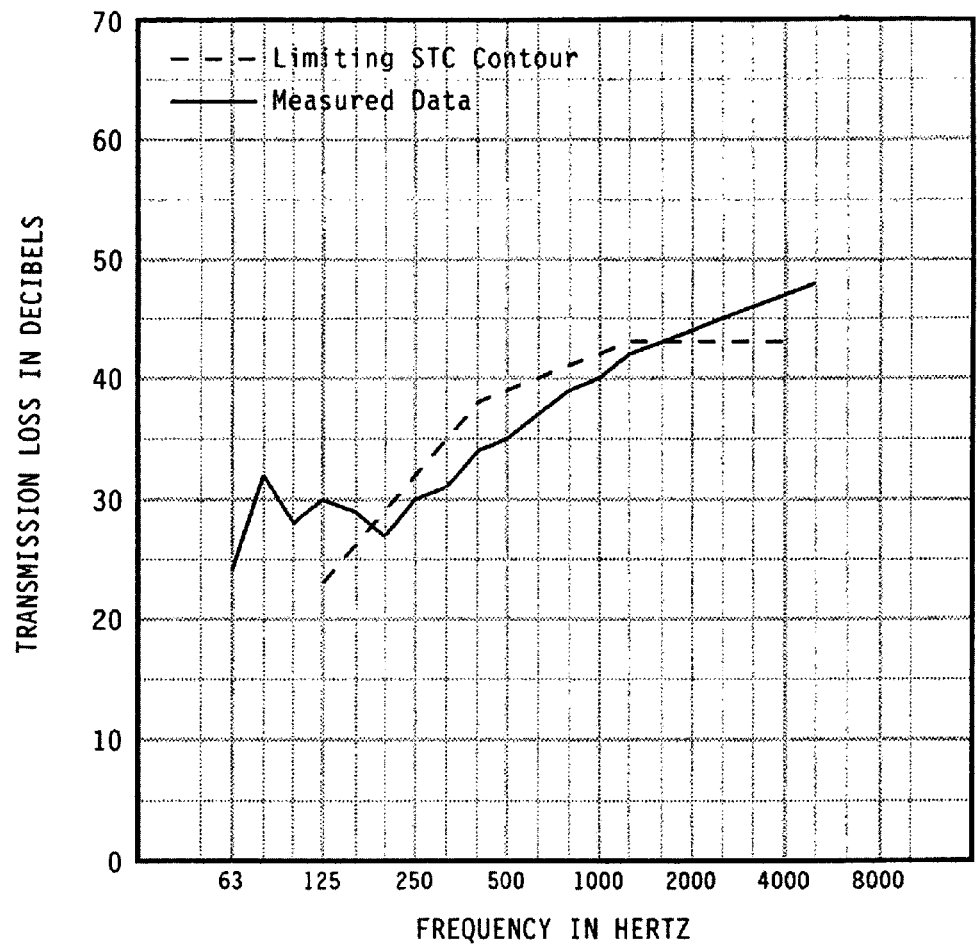
Figure 8:
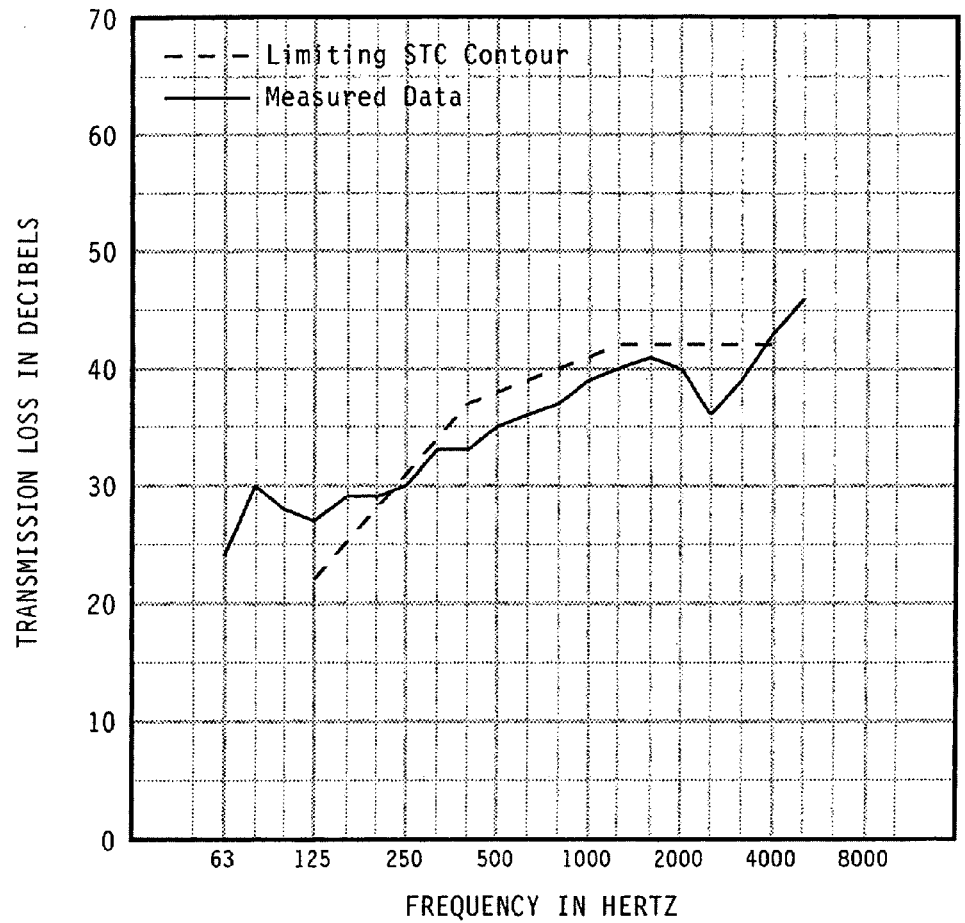
Figure 9:
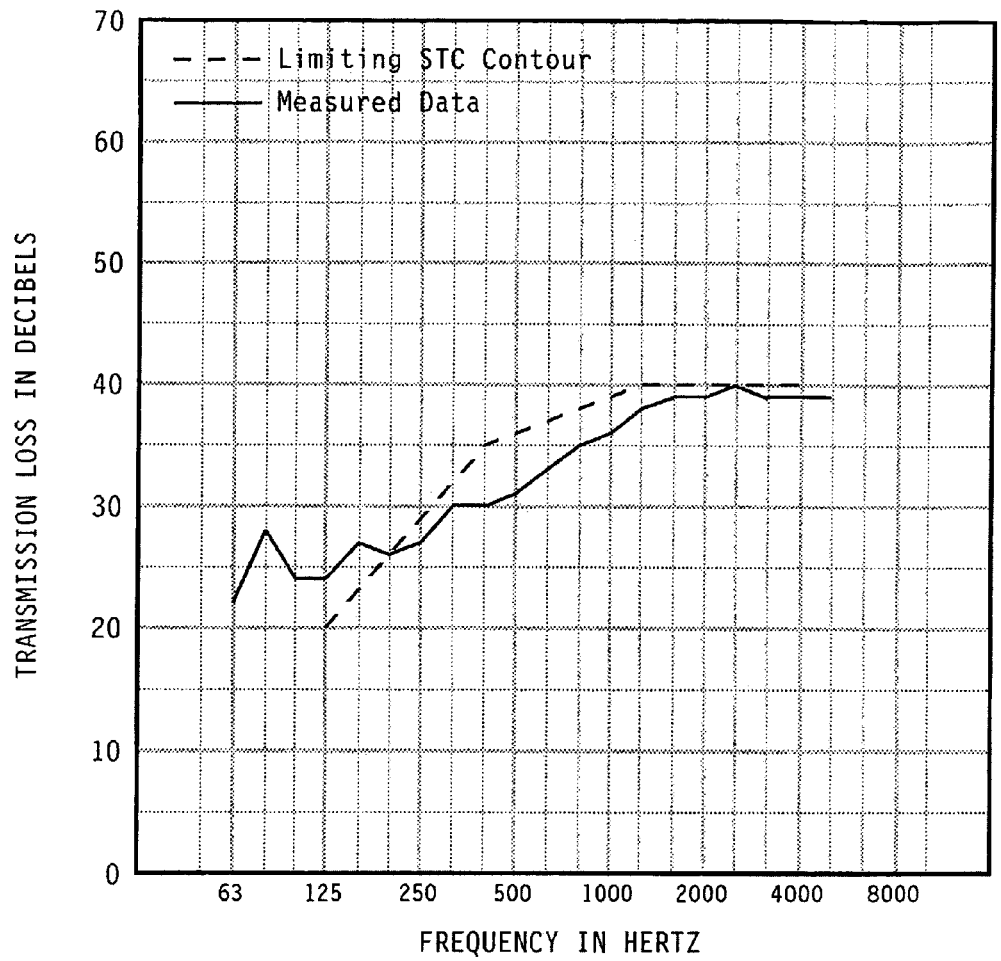
Figure 10:
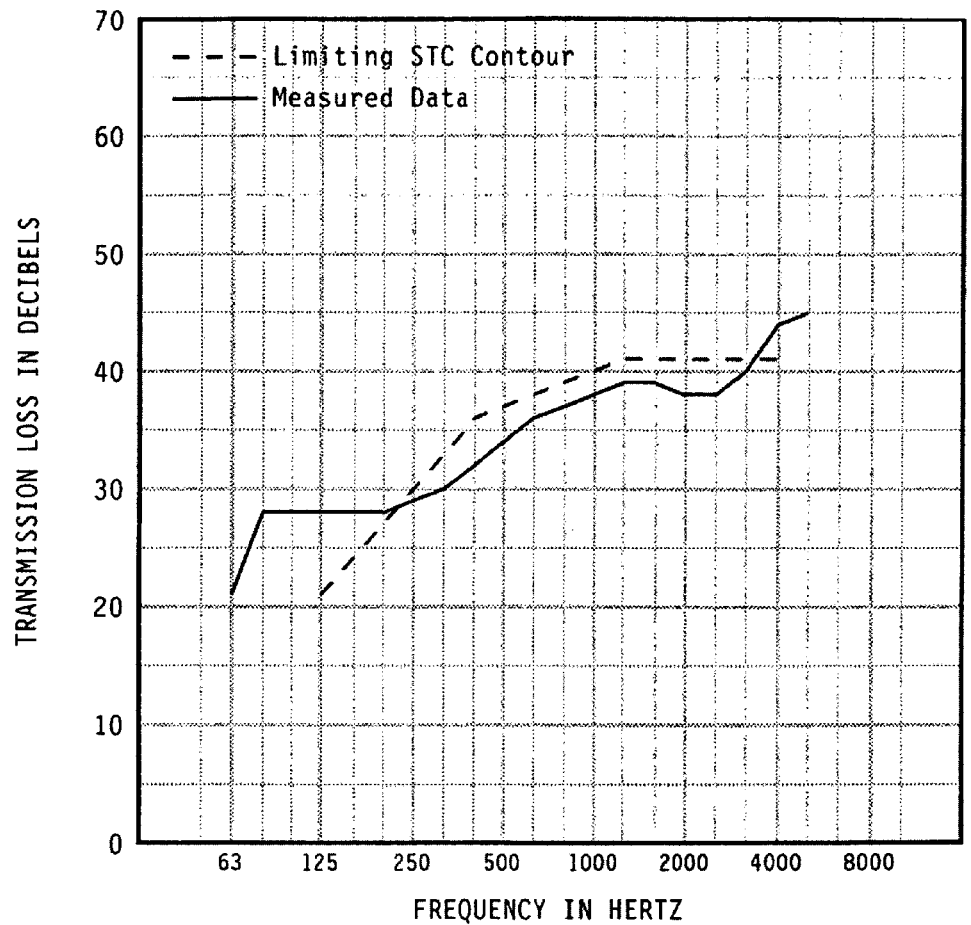

Data showing the transmission loss in decibels (dB) as a function of frequency for the soundproofing panels of FIGS. 2-5 is set forth in FIGS. 6-9. FIG. 6 shows a transmission loss contour for a 4'×4' sample comprising a 5/8" thick damped panel layer 110, as shown in FIG. 2. The transmission loss in decibels varies from 19 dB at 63 Hz to approximately 45 dB at 4,000 Hz. FIG. 10 shows a transmission loss contour for a 4'×4' sample comprising two 5/8" thick damped panel layers 110 coupled by glue.

Referring to FIGS. 6-10, the two rows of the table reflect the acoustical performance of the panel in terms of the 1/3 octave frequency bands. The top line of each row represents the 1/3 octave band center frequency. The second row of numbers in each horizontal category represents the total attenuation in decibels, and the third set of numbers represents a 95% confidence level in dB. The fourth row is used to compute the STC value of the panel. For the use of a proposed laminar panel system of the type shown in FIG. 4, in the standard simulated office space, the CAC is expected to be 54. In accordance with embodiments of the present invention, a ceiling tile assembly having a CAC of at least 35 is provided. More preferably, a CAC of at least 50 is provided.

Accordingly, laminar structures as described herein may provide a significant improvement in the ceiling attenuation class rating associated with the ceiling systems. When these laminar structures are provided in a suspended ceiling system, such as ceiling tile assembly 100, the amount of sound transmitted from one room to adjacent rooms through the ceiling plenum may be significantly reduced.

An alternative embodiment of the laminar panel is asymmetric, being made up of a relatively thick layer of material on one surface of which is placed viscoelastic adhesive. Over the viscoelastic adhesive is placed a thin layer of material relative to the first layer of material. This thin layer of material can be a constraining layer, such as metal or vinyl or rubber or ceramic or composite or any other appropriate thin material. This structure has sound reducing qualities, but is lighter and easier to handle than the structures described in FIGS. 2-5. Such a structure, for example, could be made up of layers 211, 212 and 213 of the structure shown in FIG. 2.

Figure 12:
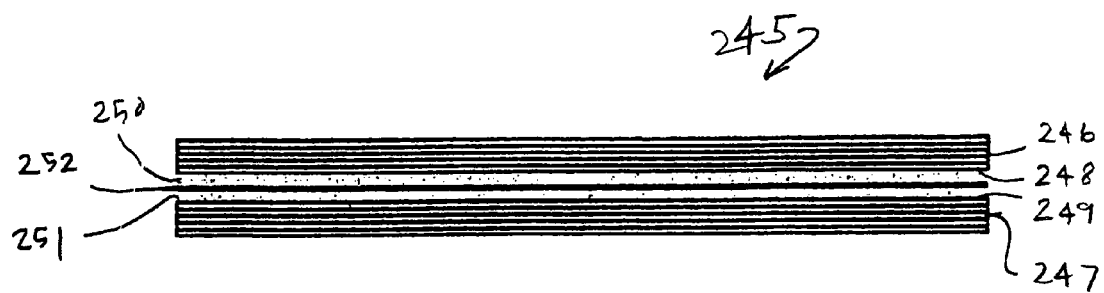
FIGS. 12-13 show other embodiments of laminar panels which can be utilized in constructing a ceiling tile assembly in accordance with embodiments of the present invention.

One version of a laminar panel suitable for use in connection with the present invention is illustrated in FIG. 12. In this version, laminar panel 245 includes a layer 246, which may be for example 5/8" thick plywood, and a layer 247, which also may be 5/8" thick plywood. Other thicknesses of plywood may also be utilized, and it is not necessary that both layers 246, 247 have the same thickness. The inner surfaces, 248 and 249, of layers 246 and 247 respectively are coated with a viscoelastic polymer, such as the adhesive 212 utilized in the structure of FIG. 2. The characteristics of the viscoelastic polymer are described previously herein in connection with the prior figures. Viscoelastic adhesive layers 250 and 251 may be, for example, 1/16" thick; however, of course, other thicknesses may be utilized. In the laminar panel 245 of FIG. 12, a constraining layer 252 of metal, which typically may be 30-gauge steel, is provided. Other thicknesses may be used for constraining layer 252 ranging from 10 gauge to 40 gauge depending on weight, thickness, and CAC desired for panel 245. Constraining layer 252 should not be creased since doing so will reduce the ability of the structure to reduce the transmission of sound. Only completely flat, undamaged pieces of metal should be utilized in this laminar structure. Suitable metals for constraining layer 252 include, for example, galvanized steel, stainless steel, aluminum, ultra-light weight titanium, and laminated layers of metal including laminates of aluminum and titanium. A composite of two or more metals may also be used.

If galvanized steel is utilized for constraining layer 252, it should be non-oiled and of regular spackle, and as noted above it should not be creased and should be perfectly flat. In constructing laminar panel 245, viscoelastic adhesive layers 250 and 251 are rolled onto surfaces 248 and 249, respectively, of layers 246 and 247. Next, constraining layer 252 is placed on the exposed surface of viscoelastic adhesive layer 251, and layer 246 with its associated layer 250 of viscoelastic adhesive are then placed on top of the constraining layer 252. The structure 245 is then compressed using a pressure of approximately 1 to 5 lbs. per square inch. Application of heat may also be used and if so the temperature range would be about 90 degrees to 130° F.

Figure 13:
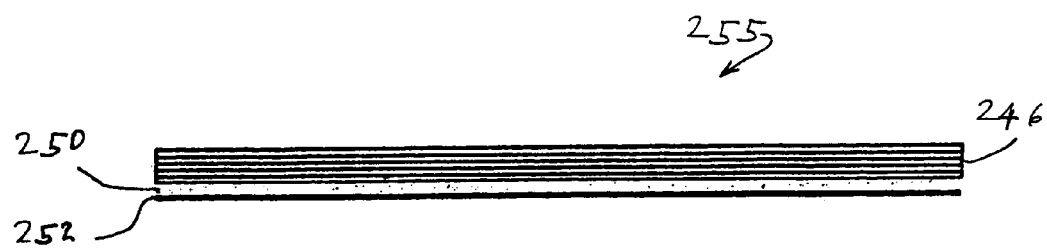

FIG. 13 illustrates a further version of a laminar panel which may be used in a ceiling tile, in accordance with embodiments of the present invention. Laminar panel 255 includes layer 246, viscoelastic adhesive layer 250 and constraining layer 252, all as described above in connection with laminar panel 245. However, in the version of FIG. 13 neither a second layer of viscoelastic adhesive nor a second layer of another material is required. Laminar panel 255 also possesses sound reducing characteristics.

Figure 14:
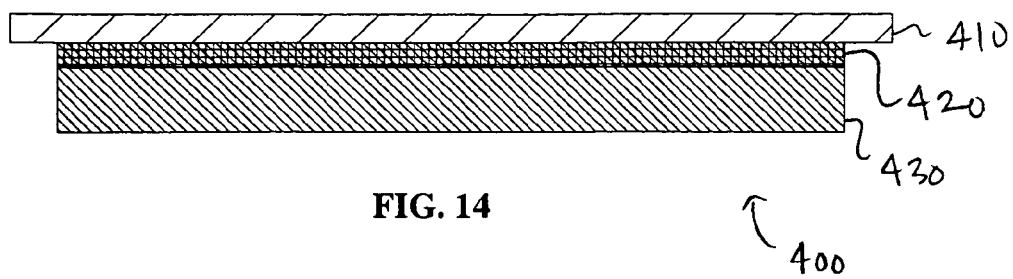
FIG. 14 shows a ceiling tile assembly, in accordance with other embodiments of the present invention.

FIG. 14 shows another ceiling tile assembly 400, in accordance with other embodiments of the present invention. The ceiling tile assembly 400 comprises a constraining layer 410 coupled to an absorption layer 430 by a viscoelastic adhesive layer 420. In contrast with the damped panel layer 110 used in the ceiling tile assembly 100 in FIG. 1, the entire ceiling tile assembly 400 is used as the sound damping layer.

In FIG. 14, the constraining layer 410 comprises a layer of material having a high stiffness. In some embodiments, the stiffness of the constraining layer 410 is at least 1 GPa. This stiffness may be achieved by using a material having a high Young's Modulus, such as, e.g., metal, plastic, ceramic, gypsum, or combinations thereof. The desired Young's Modulus may be 10 GPa or greater. Alternatively, the stiffness may be achieved by using a material having a lower Young's Modulus, but having a thickness sufficient to provide the desired stiffness. The absorption layer 430 may comprise any of the absorption layers described above with respect to FIG. 1. The viscoelastic adhesive layer 420 may comprise any of the viscoelastic adhesive layers above and may have a thickness, e.g., of between 0.001" to 0.200". The thicknesses of the constraining layer 410 and the absorption layer 430 may vary, depending on the desired results, but may be, e.g., 0.001" to 4".

The ceiling tile assembly shown in FIG. 14 may be constructed, for example, by applying the viscoelastic adhesive layer 420 to the constraining layer 410 and then pressing the absorption layer 430 against the adhesive layer 420 and the constraining layer 410 with a pressure of approximately 1 psi at a temperature of up to 110° F. When the ceiling tile assembly 14 is used, improved CAC values of 5-25 points over conventional ceiling tile designs may be achieved.

Figure 15:
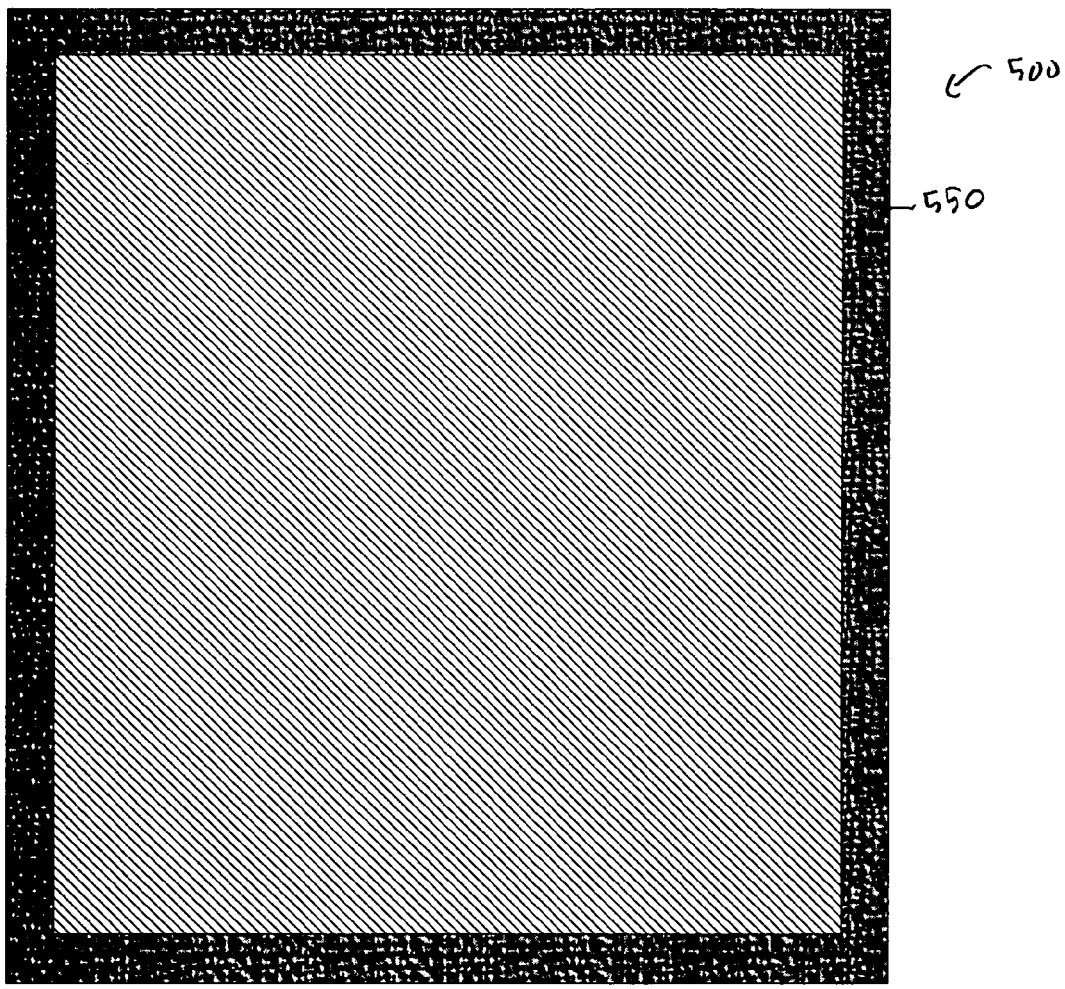
FIG. 15 shows a front view of a ceiling tile assembly having an edge seal in accordance with embodiments of the present invention.

In accordance with other embodiments of the present invention, an edge seal may be provided on a portion of the ceiling tile assembly to provide an improved acoustic seal with the support structure 101 when the ceiling tile is installed as part of a suspended ceiling. FIG. 15 shows a ceiling tile 500 having an edge seal 550, in accordance with embodiments of the present invention. The edge seal 550 may comprise a compressible material that is capable of forming a good acoustic seal with the T-bars 102 of the support structure 101, even when the surfaces of the ceiling tile 500 and the T-bars 102 are not perfectly aligned. The edge seal 550 may comprise, for example, a block seal comprising a layer of tape applied along a portion of the edge of the ceiling tile 500 that contacts the T-bars 102 of the support structure 101. The tape may comprise closed cell foam, rubber, DuPont Kapton® polyimide film, synthetic rubber such as neoprene, a nitrile/EPDM blend, or the like. In other embodiments, the edge seal may take other forms. For example, various types of conventional materials and designs used for weatherstripping may be utilized, such as v-seals, fin seals, and compression bulb seals.

Figure 16A:
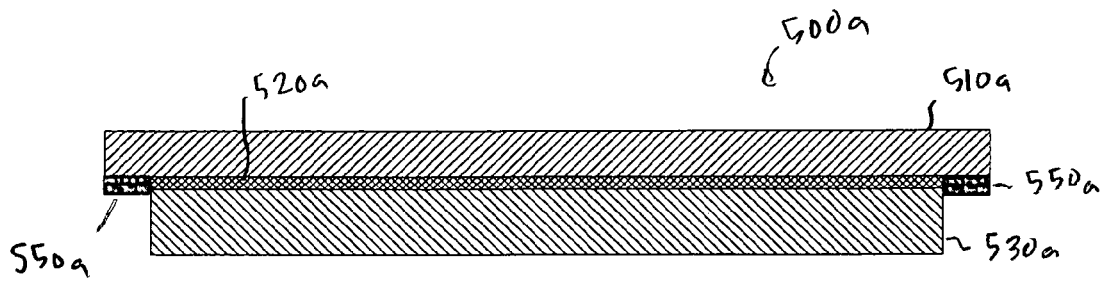
FIGS. 16A-16E show side views of ceiling tile assemblies having edge seals in accordance with embodiments of the present invention.
Figure 16B:
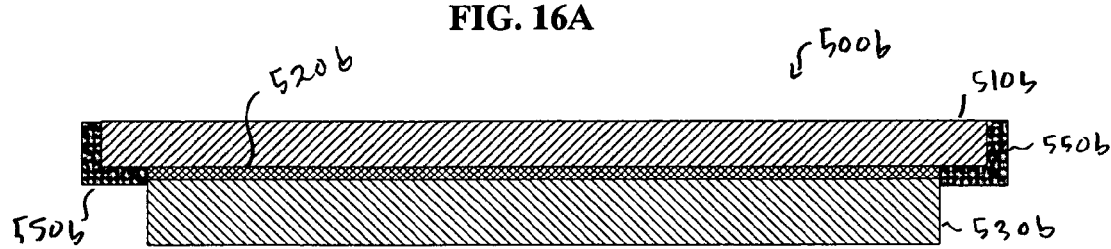

The edge seal 550 may be provided on the ceiling tile 500 in a variety of locations, examples of which are shown in FIGS. 16A-16E. In FIGS. 16A-16B, each of the ceiling tiles 500a, 500b includes a damped panel layer 510a, 510b that extends beyond the edge of the adhesive layer 520a, 520b and the absorption layer 530a, 530b so that the damped panel layer 510a, 510b contacts the support structure 101 when the ceiling tile 500a, 500b is installed. This design is sometimes referred to as a reveal edge detail and allows the panel face to rest below the T-bars of the support structure. In FIG. 16A, a layer of tape 550a is provided along the front face edge of the ceiling tile 500a. In FIG. 16B, a layer of tape 550b is provided along the front face edge and the side edge of the ceiling tile 500b. Providing the tape 550b along the side edge of the ceiling tile 500b can help provide a more complete acoustic seal between the support structure and the damped panel layer 510b, which is more rigid than the absorption layer 530b.

Figure 16C:
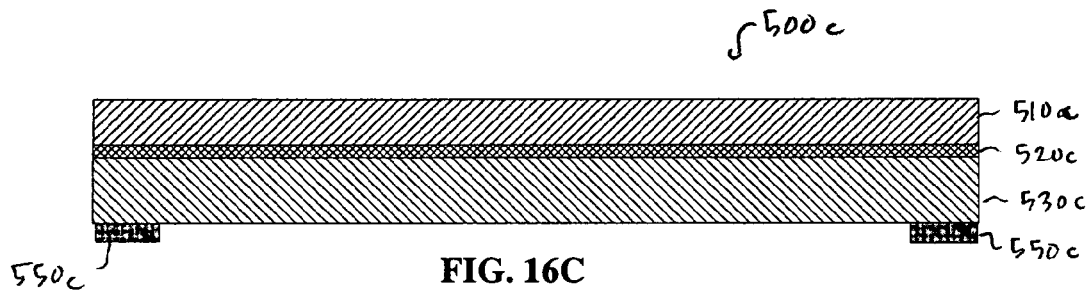
Figure 16D:
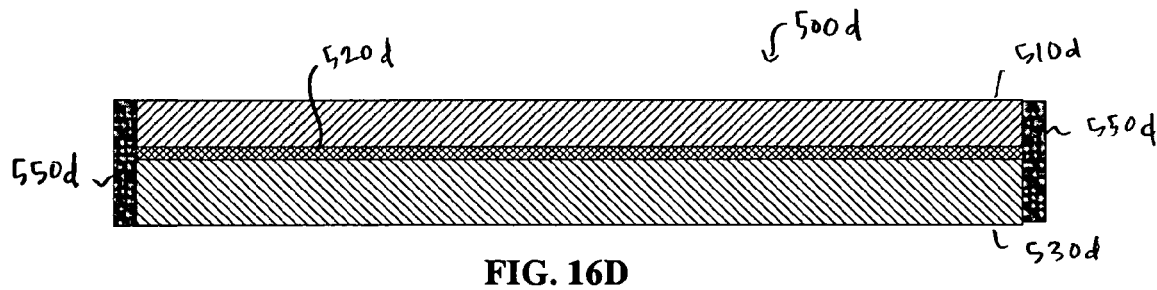
Figure 16E:
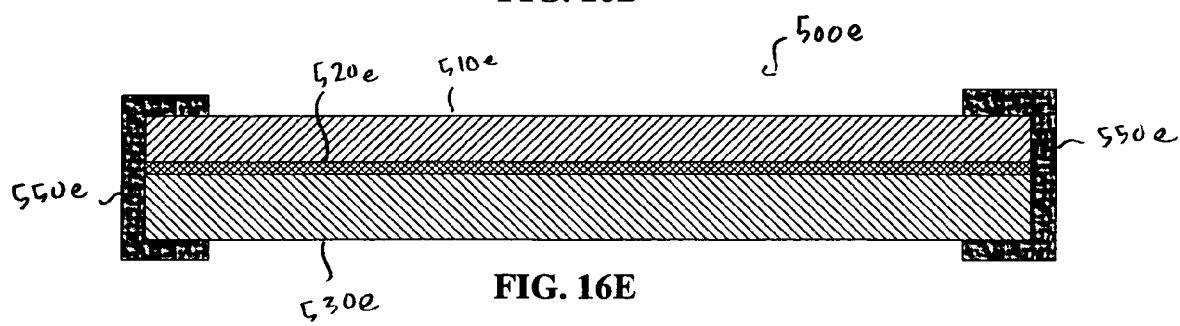

In FIGS. 16C-16E, the various layers of the ceiling tiles 500c-500e have the same width. This design is sometimes referred to as a square edge detail and allows the front face of the ceiling tile assembly to rest on top of the T-bar grid flange. In FIG. 16C, the layer of tape 550c is provided only on the front face edge of the ceiling tile 500c, in FIG. 16D, the layer of tape 550d is provided only on the side edge of the ceiling tile 500d, and in FIG. 16E, the layer of tape 550e is provided on the front face edge, the side edge, and the top face edge of the ceiling tile 500e. In other embodiments, the design of the layers of the ceiling tile and the edge seal may vary, as would be understood by one of ordinary skill in the art.

Figure 11:
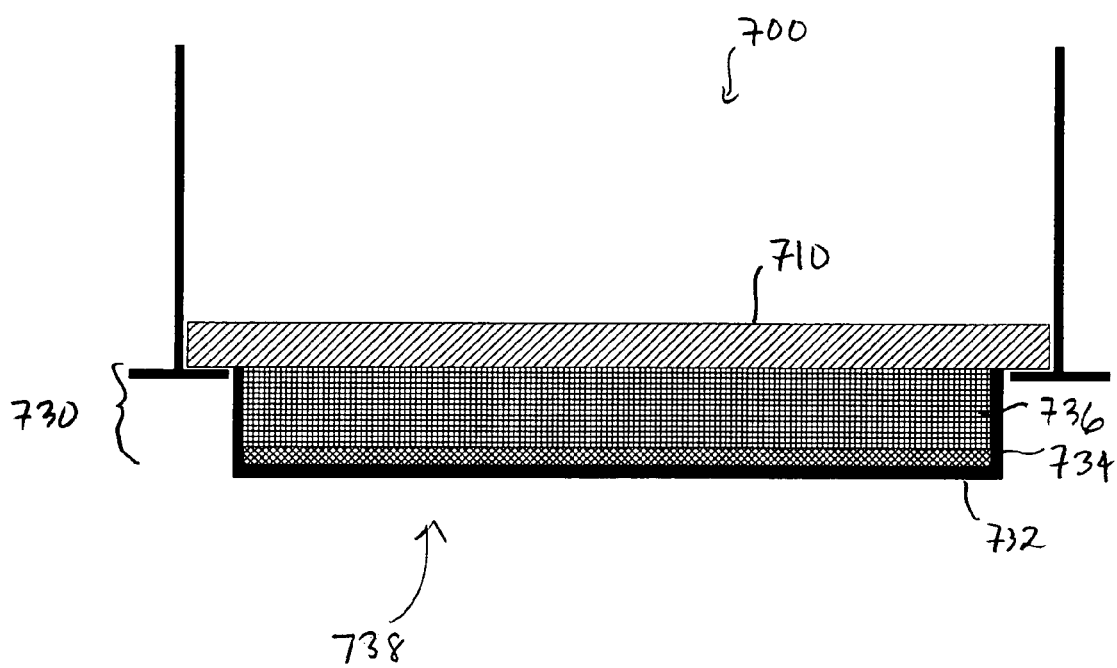
FIG. 11 shows a side view of a ceiling tile assembly with a multi-layered absorption layer, in accordance with other embodiments of the present invention.

FIG. 11 shows a side view of a ceiling tile assembly 700 comprising a damped panel layer 710 and a multi-layered absorption layer 730, in accordance with other embodiments of the present invention. In the illustrated embodiment, the damped panel layer 710 comprises a laminar panel including a viscoelastic layer, such as, e.g., laminar panels 200, 245, 255, 261, 262, and 263 described above. The absorption layer 730 comprises a metal tray 732 that is coupled to the damped panel layer 710 such that the front face 738 of the metal tray 732 is separated from the damped panel layer 710 by a prescribed distance, thereby creating a region that can be filled with absorptive materials. In this embodiment, the region is filled with a first sublayer 734 and a second sublayer 736. The first sublayer 734 may comprise, e.g., a thin sheet of a synthetic material, such as DuPont Kevlar® or a fiberglass nonwoven mat, which provides good sound absorption. The second sublayer 736 may comprise, e.g., a layer of fiberglass, which provides additional absorptive qualities. The metal tray 732 may comprise, e.g., a performed steel sheet, which provides physical protection and structural integrity for the ceiling tile assembly 500 while allowing the sound to travel through holes in the tray 732 to be absorbed and dissipated by the ceiling tile assembly 700. It has been observed that many relatively thin materials act as efficient absorbers when separated from a rigid reflecting material by ¼ of a wavelength. At that distance, the acoustic wave has little pressure and maximum particle velocity, so the thin material is able to dissipate energy from the moving wave. The addition of the sublayers 734, 736 can improve performance.

While the invention has been described in terms of particular embodiments and illustrative figures, those of ordinary skill in the art will recognize that the invention is not limited to the embodiments or figures described. For example, in other embodiments of this invention, the number, type, thickness and placement order of both external and internal layer materials may vary. In addition, the dimensions given for each material in the structures of this invention can be varied as desired to control cost, overall thickness, weight, and desired acoustic performance. For example, the ceiling tiles may have facial dimensions of, e.g., 2'×2', 2'×4', 4'×8', or any other desired dimensions. The described embodiments and their dimensions are illustrative only and not limiting.

In addition, the embodiments described herein show square edge (sometimes referred to as "tegular") and reveal edge details for the ceiling tiles. It will be understood that in other embodiments, various types of edge details may be used, depending on the desired installation and appearance.

In some embodiments, an additional facing layer may be provided on a side of the ceiling tile facing the interior of the room. This facing layer may provide improved aesthetic appearance, protect the ceiling tile from wear, make the ceiling tile easier to clean, or may enhance the acoustical properties of the ceiling tile. The facing layer may comprise, e.g., a layer of vinyl, cloth, fiberglass, paint, or other coating.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A ceiling panel assembly, comprising:
    a sound damping layer comprising a first mass layer, a first viscoelastic layer, a constraining layer having a first side and a second side, a second mass layer, and a second viscoelastic layer, wherein the first viscoelastic layer is positioned between the first side of the constraining layer and the first mass layer, and the second viscoelastic layer is positioned between the second side of the constraining layer and the second mass layer;
    an acoustical absorption layer coupled to the sound damping layer, said acoustical absorption layer having a higher Sound Absorption Average (SAA) value than the sound damping layer; and
    a compressible material, which provides sound attenuation, provided along one surface of at least one edge of the ceiling panel assembly; further wherein
    said compressible material is in direct contact with at least one of said sound damping layer and said acoustical absorption layer.

2. The ceiling panel assembly of claim 1, wherein the acoustical absorption layer has a SAA value of at least 0.20.

3. The ceiling panel assembly of claim 2, wherein the ceiling panel assembly has a Ceiling Attenuation Class (CAC) rating of at least 25.

4. The ceiling panel assembly of claim 1, wherein the acoustical absorption layer comprises fiberglass, cellulose, mineral wool, foam, or a granular material.

5. The ceiling panel assembly of claim 4, wherein the acoustical absorption layer comprises melamine foam.

6. The ceiling panel assembly of claim 1, further comprising a facing layer coupled to the acoustical absorption layer.

7. The ceiling panel assembly of claim 6, wherein the facing layer comprises vinyl, cloth, fiberglass, or paint.

8. The ceiling panel assembly of claim 1, wherein the first viscoelastic layer comprises a first viscoelastic adhesive layer and the constraining layer is coupled to the first mass layer by the first viscoelastic adhesive layer, and the second viscoelastic layer comprises a second viscoelastic adhesive layer and the constraining layer is coupled to the second mass layer by the second viscoelastic adhesive layer.

9. The ceiling panel assembly of claim 8, wherein the constraining layer comprises a metal.

10. The ceiling panel assembly of claim 9, wherein the constraining layer comprises a layer of galvanized steel.

11. The ceiling panel assembly of claim 9, wherein the constraining layer comprises a sheet metal layer of selected thickness.

12. The ceiling panel assembly of claim 8, wherein the constraining layer comprises a layer of material selected from the group consisting of: solid petroleum-based synthetic material, mass-loaded vinyl, ceramic, and composite.

13. The ceiling panel assembly of claim 12, wherein the constraining layer comprises a layer of composite material comprised of fiberglass, carbon fiber, or aramid fiber.

14. The ceiling panel assembly of claim 8, wherein the first mass layer comprises gypsum board.

15. The ceiling panel assembly of claim 8, wherein the first mass layer comprises a material selected from the group consisting of: wood, a cellulose based material, metal, ceramic, a composite material, and wood.

16. The ceiling panel assembly of claim 1, wherein the second mass layer comprises a material selected from the group consisting of: gypsum board, wood, a cellulose based material, metal, ceramic, a composite material, and wood.

17. The ceiling panel assembly of claim 1, wherein the compressible material is provided along one surface of at least one edge of the ceiling panel assembly; wherein said surface is a front face edge of the ceiling panel assembly.

18. The ceiling panel assembly of claim 1, wherein the compressible material is provided along a side of the ceiling panel assembly along the at least one edge.

19. The ceiling panel assembly of claim 1, wherein the compressible material comprises a compressible tape, a v-seal, a fin seal, or a compression bulb seal.

20. The ceiling panel assembly of claim 1, wherein the first and second mass layers are non-metal.

21. The ceiling panel assembly of claim 1, wherein the sound damping layer and the acoustical absorption layer are separated by ¼ of a wavelength.

22. The ceiling panel assembly of claim 1 wherein said constraining layer is a layer of gypsum.

23. The ceiling panel assembly of claim 1 wherein said constraining layer is selected from a group consisting of metal, plastic, and ceramic.

24. The ceiling panel assembly of claim 1 wherein said constraining layer has a thickness that is between 0.001 inches and 4 inches.

25. The ceiling panel assembly of claim 1 wherein the area of the panel is selected from a group consisting of 2 feet wide by 2 feet long panels and 2 feet wide by 4 feet long panels.

26. The ceiling panel assembly of claim 1 wherein said assembly provides a CAC rating of at least 25.

27. The ceiling panel assembly of claim 1, wherein the first viscoelastic layer comprises a viscoelastic adhesive and the acoustical absorption layer is coupled to the sound damping layer by the viscoelastic adhesive.

28. A method of manufacturing a ceiling panel assembly, the method comprising:
    providing a sound damping layer comprising a first mass layer, a first viscoelastic layer, a constraining layer having a first side and a second side, a second 1 mass layer, and a second viscoelastic layer, wherein the first viscoelastic layer is positioned between the first side of the constraining layer and the first mass layer, and the second viscoelastic layer is positioned between the second side of the constraining layer and the second mass layer;

coupling an acoustical absorption layer to the sound damping layer, wherein said acoustical absorption layer has a higher Sound Absorption Average (SAA) value than the sound damping layer; and providing a compressible material, which provides sound attenuation, provided along one surface of at least one edge of the ceiling panel assembly; further wherein said compressible material is in direct contact with at least one of said sound damping layer and said acoustical absorption layer.

29. The method of claim 28, wherein the coupling an acoustical absorption layer to the sound damping layer comprises applying an adhesive layer to the sound damping layer and coupling the acoustical absorption layer to the adhesive layer.

30. The method of claim 28, wherein the acoustical absorption layer comprises fiberglass, cellulose, mineral wool, foam, or a granular material.

31. The method of claim 30, wherein the acoustical absorption layer comprises melamine foam.

32. The method of claim 28, further comprising applying a facing layer to the acoustical absorption layer.

33. The method of claim 32, wherein the facing layer comprises vinyl, cloth, fiberglass, or paint.

34. The method of claim 28, wherein the first viscoelastic layer comprises a first viscoelastic adhesive layer and the constraining layer is coupled to the first mass layer by the first viscoelastic adhesive layer, and the second viscoelastic layer comprises a second viscoelastic adhesive layer and the constraining layer is coupled to the second mass layer by the second viscoelastic adhesive layer.

35. The method of claim 34, wherein the constraining layer comprises a metal.

36. The method of claim 35, wherein the constraining layer comprises a layer of galvanized steel.

37. The method of claim 35, wherein the constraining layer comprises a sheet metal layer of selected thickness.

38. The method of claim 34, wherein the constraining layer comprises a layer of material selected from the group consisting of: solid petroleum-based synthetic material, mass-loaded vinyl, ceramic, and composite.

39. The method of claim 38, wherein the constraining layer comprises a layer of composite material comprised of fiberglass, carbon fiber, or aramid fiber.

40. The method of claim 34, wherein the first mass layer comprises gypsum board.

41. The method of claim 34, wherein the first mass layer comprises a material selected from the group consisting of: wood, a cellulose based material, metal, ceramic, a composite material, and wood.

42. The method of claim 28, wherein the second mass layer comprises a material selected from the group consisting of: gypsum board, wood, a cellulose based material, metal, ceramic, a composite material, and wood.

43. The method of claim 28, wherein the compressible material is provided along one surface of at least one edge of the ceiling panel assembly; wherein said surface is a front face edge of the ceiling panel assembly.

44. The method of claim 28, wherein the compressible material is provided along a side of the ceiling panel assembly along the at least one edge.

45. The method of claim 28, wherein the compressible material comprises a compressible tape, a v-seal, a fin seal, or a compression bulb seal.

46. The method of claim 28, wherein the first and second mass layers are non-metal.

47. The method of claim 28, wherein the first viscoelastic layer comprises a viscoelastic adhesive and the acoustical absorption layer is coupled to the sound damping layer by the viscoelastic adhesive.

* * * * *